US010010908B2

(12) United States Patent
Lendl et al.

(10) Patent No.: US 10,010,908 B2
(45) Date of Patent: Jul. 3, 2018

(54) METHOD FOR COATING A SURFACE OF AN ELECTRICALLY NON-CONDUCTIVE SUBSTRATE WITH POWDER COATINGS

(71) Applicant: IGP PULVERTECHNIK AG, Will (CH)

(72) Inventors: Thomas Lendl, Andwil (CH); René Mattern, Bonn (DE); Manuel Slezinski, Kreuzlingen (CH)

(73) Assignee: IGP Pulvertechnik AG, Wil (CH)

( * ) Notice: Subject to any disclaimer, the term of this patent is extended or adjusted under 35 U.S.C. 154(b) by 225 days.

(21) Appl. No.: 14/895,563

(22) PCT Filed: Jun. 19, 2014

(86) PCT No.: PCT/EP2014/062949
§ 371 (c)(1),
(2) Date: Dec. 3, 2015

(87) PCT Pub. No.: WO2014/202724
PCT Pub. Date: Dec. 24, 2014

(65) Prior Publication Data
US 2016/0121361 A1 May 5, 2016

(30) Foreign Application Priority Data

Jun. 19, 2013 (EP) ..................................... 13172801

(51) Int. Cl.
*B05D 1/04* (2006.01)
*B05D 3/12* (2006.01)
(Continued)

(52) U.S. Cl.
CPC ............ *B05D 1/045* (2013.01); *B05D 3/0218* (2013.01); *B05D 3/06* (2013.01); *B05D 3/12* (2013.01);
(Continued)

(58) Field of Classification Search
CPC ..................................................... B05D 1/045
See application file for complete search history.

(56) References Cited

U.S. PATENT DOCUMENTS

| 3,856,498 A | 12/1974 | Campagna et al. |
| 8,932,720 B2 | 1/2015 | Dornbusch et al. |

(Continued)

FOREIGN PATENT DOCUMENTS

| DE | 197 48 927 A1 | 12/1998 |
| EP | 0 372 740 A2 | 6/1990 |

(Continued)

OTHER PUBLICATIONS

International Search Report Corresponding to PCT/EP2014/062949 dated Aug. 28, 2014.
Written Opinion Corresponding to PCT/EP2014/062949 dated Aug. 28, 2014.

*Primary Examiner* — Megan McCulley
(74) *Attorney, Agent, or Firm* — Davis & Bujold PLLC; Michael J. Bujold

(57) ABSTRACT

A method for coating a surface of an electrically non-conductive substrate with powder coatings, the method comprising the following steps: providing a substrate to be coated, pre-heating the substrate to be coated to a temperature of 40 to 140° C. in order to decrease the surface resistance of the substrate to less than $10^{12}$ ohms, preferably to within the range of $10^{10}$ to less than $10^{12}$ ohms, electrostatically coating the surface with powder coating in a single layer, which powder coating comprises a reactive system which, in particular, cures into a thermoset, curing the powder coating layer at a temperature of 170° C. or less.

18 Claims, 3 Drawing Sheets

Figure 1:
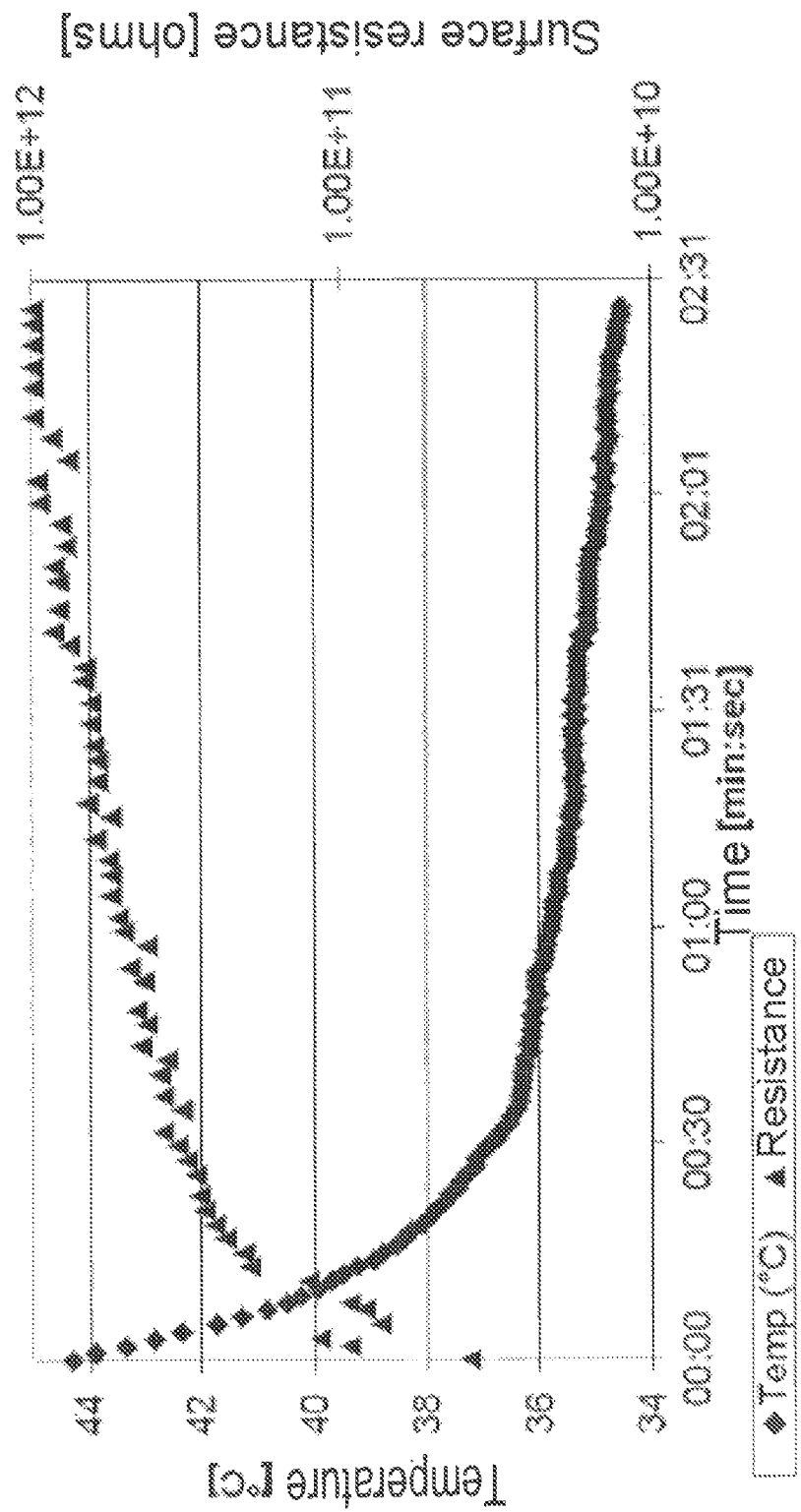

(51) Int. Cl.
  *B05D 3/14* (2006.01)
  *C09D 127/12* (2006.01)
  *C09D 133/08* (2006.01)
  *C09D 163/00* (2006.01)
  *C09D 167/00* (2006.01)
  *C09D 175/04* (2006.01)
  *C09D 177/00* (2006.01)
  *B05D 3/02* (2006.01)
  *B05D 3/06* (2006.01)
  *B05D 3/08* (2006.01)
  *B05D 1/24* (2006.01)

(52) U.S. Cl.
  CPC ........... *B05D 3/142* (2013.01); *C09D 127/12* (2013.01); *C09D 133/08* (2013.01); *C09D 163/00* (2013.01); *C09D 167/00* (2013.01); *C09D 175/04* (2013.01); *C09D 177/00* (2013.01); *B05D 1/24* (2013.01); *B05D 3/0263* (2013.01); *B05D 3/0272* (2013.01); *B05D 3/067* (2013.01); *B05D 3/08* (2013.01); *B05D 2401/32* (2013.01)

(56) References Cited

U.S. PATENT DOCUMENTS

| | | |
|---|---|---|
| 2003/0026897 A1 | 2/2003 | Barberan Latorre |
| 2003/0049451 A1* | 3/2003 | Stay .................. B05D 1/045 428/411.1 |
| 2003/0113476 A1 | 6/2003 | Fredricksen et al. |
| 2008/0069949 A1* | 3/2008 | Glockner ................ C08L 51/06 427/240 |
| 2009/0220704 A1 | 9/2009 | Eustace |
| 2009/0298997 A1 | 12/2009 | Baumgart et al. |
| 2010/0266782 A1 | 10/2010 | Langlois |

FOREIGN PATENT DOCUMENTS

| | | |
|---|---|---|
| EP | 1 321 197 A2 | 6/2003 |
| WO | 02/04694 A1 | 1/2002 |
| WO | 02/46321 A2 | 6/2002 |
| WO | 2007/054289 A2 | 5/2007 |
| WO | 2010/028848 A1 | 3/2010 |
| WO | 2010/043684 A1 | 4/2010 |

* cited by examiner

METHOD FOR COATING A SURFACE OF AN ELECTRICALLY NON-CONDUCTIVE SUBSTRATE WITH POWDER COATINGS

The present invention relates to a method for coating a surface of an electrically nonconducting substrate with powder coatings.

Known from the prior art are methods which address the coating of nonconducting substrates.

For example, WO 02/04694 A1 shows a method for applying a coating to a plastics surface by means of a thermal spraying process, where an adhesion promoter is applied as first layer. Currently, however, the need for such an adhesion promoter is considered a disadvantage.

WO 2007/054289 A2 discloses an aqueous powder dispersion and also a method for applying such a dispersion to a plastic or to a fiber composite.

WO 02/46321 A2 shows an aqueous, effect-imparting coating material with a water-miscible organic solvent, and also a method for employing it on, among other substrates, a plastic or a fiber composite. The use of solvents is not permissible across all sectors, and the drying of the aqueous dispersion is energy-intensive.

WO 2010/028848 A1 discloses a water-based composition of a two-component coating material which is used as a filler in the surface coating of fiber-plastic assemblies. The cure temperature is below 40° C. Two-component systems of these kinds are complex to employ; a correct mixing ratio must be observed.

EP 1 321 197 A2 discloses a coating method with powder coatings, in which the powder coating is applied to a substrate from a fluidized bed by means of a transfer belt. The substrate may be conducting or nonconducting. Unsolved, however, are the problems of adhesion and of coating quality.

DE 197 48 927 A1 discloses a method for producing functional glazes on the surface of nonmetallic materials. In this process, surfaces are preheated, exposed to a jet of powder, and the coating is cured by introduction of heat. The preheating and curing necessitate high temperatures.

US 2010/266782 A1 discloses a coating method for conducting and nonconducting workplaces by means of double or multiple powder application. A first powder applied gels on a preheated surface, at least one further powder is applied, and the coating is cured by introduction of heat.

It is an object of the invention to overcome the disadvantages of the prior art. The intention in particular is to provide a method which allows nonconducting surfaces to be coated with dry powder coatings, which fulfills exacting requirements with regard to coating quality and strength of adhesion, and which is extremely easy to implement.

This object is achieved by the method defined in the independent claim. Further embodiments emerge from the dependent claims.

Here and below, an electrically nonconducting substrate means a substance or material having a surface resistance of greater than $10^{12} \Omega$ (according to DIN EN 61340-2-3:2000). Here it should be noted that the surface resistance is determined on specimens which are cuboidal in form and have dimensions in all directions of at least 1 mm×110 mm×120 mm (thickness×width×length). In the case of sheetlike or thin-wall substrates having a wall thickness of less than 1 mm, a specimen is to be formed from a plurality of substrate sections layered one above another, so that the resulting thickness is at least 1 mm. The surface resistance is to be determined in each case of at least 3 specimens, with the measurements obtained being averaged. Measuring probes as specified in DIN EN 61340-2-3:2000 shall be used. The surface of the specimens shall be cleaned using a soft cloth wetted with isopropanol. After this cleaning and before the determination of the surface resistance, the specimen shall be conditioned for at least one hour at 23° C.+/−2° C. and a relative humidity of 30%. Measurement shall take place with a test voltage of 100 V. The surface resistance or the voltage is read off after the measurement duration defined in DIN EN 61340-2-3:2000 has elapsed. For each specimen, at least three measurements shall be carried out; the measurement results per specimen shall be averaged. All other data relevant for determining the surface resistance can be taken from DIN EN 61340-2-3:2000. In this way, a substrate can be classified (conductive, dissipative, insulating) prior to coating. Here and below, electrostatic properties are differentiated. In this context, substrates having a surface resistance of $<10^4$ ohms are conductive, those from $10^4$ to $<10^{12}$ ohms dissipative, and those $>10^{12}$ ohms insulating. The transitions here are fluid. In accordance with the aforementioned DIN EN, preheated substrates are used for determining the effect of the preheating on the conductivity/surface resistance.

In accordance with DIN EN 61340, the surface resistance measurements may also take place, alternatively, with an instrument from Wolfgang Warmbier, such as the SRM-200. As a result of the integrated electrodes, measurement may also be carried out on smaller substrates with a size of at least 80 mm×80 mm×1 mm.

A method of the invention for coating a surface of an electrically nonconducting substrate with powder coatings comprises the steps of:
  providing a substrate to be coated,
  preheating the substrate to be coated to 40 to 140° C. to lower the surface resistance of the substrate to less than $10^{12}$ ohms, preferably in the range from approximately $10^{10}$ to less than $10^{12}$ ohms.
  single-layer, electrostatic coating of the surface with powder coating which comprises a reactive system, especially one curing to a thermoset,
  curing the powder coating layer at not more than 170° C.

By providing here is meant in particular that the substrate, for example, is fetched from a store and is provided for preheating, or is supplied by a supplier, in good time for preheating. Also possible, of course, is production of the substrate on site for immediate further processing.

By the preheating of the substrate it is possible to bring about at least partial, more particularly substantially complete, degassing of the substrate. The substrate is degassed to a greater or lesser extent according to the temperature and duration of preheating. Care should be taken here to ensure that the substrate is not damaged and/or deformed by the preheating. Suitable conditions are easily establishable by the skilled person, depending on the substrate used.

Furthermore, the surface resistance of the substrate is lowered by the preheating of the substrate to be coated to a temperature of 40 to 140° C. Particularly in the case of plastics, but also in the case of wood or woodbase materials, the surface resistance may become lower on heating, and the corresponding substrate which is electrically insulating at room temperature may become dissipative.

The coating of the surface with powder coating takes place in one layer and electrostatically. The powder coating here comprises a reactive system which can be cured in particular to a thermoset, which crosslinks chemically in the course of curing. Reactive systems crosslink in the course of curing and so become thermosets. Accordingly, a robust coating layer is formed on the substrate. Such systems form a coating layer possessing high chemical and mechano-technological properties, i.e., having a high resistance under load.

A coating of the invention with powder coating is particularly eco-friendly because no solvents are employed and any overspray produced can be easily reused. In single-layer application, higher layer thicknesses can be generated in comparison to liquid coating material, thereby making these layers highly resistant to the effect of moisture. Moreover, powder coatings possess high abrasion resistance and are particularly robust.

The adhesion here can be mediated only by electrostatic effects, substantially without incipient melting of the powder coating on the substrate. With reference to the powder coating used, the coating temperature may be selected such that the temperature is below the gelling temperature of the powder coating. The coating temperature corresponds to the temperature of the surface of the substrate immediately prior to the stream of powder coating striking the substrate. The coating temperature may also be selected to be above the gelling temperature, since during application of the powder coating material, in particular by spraying, the surface of the substrate is cooled by the air stream during spraying with a spray gun, for example. Here as well, therefore, the adhesion is mediated only by electrostatic effects, substantially without incipient melting of the powder coating on the substrate.

The surface can be coated at elevated temperature, corresponding to the aforementioned preheating temperature, and so the surface conductivity of the substrate is constant during powder application.

Preheating, especially in a convection oven, may take place in a temperature range as described before. Moreover, preheating may take place over a timespan of 5 sec to 90 min.

Alternatively to this, preheating may also take place in an infrared and/or near-infrared oven (NIR). By harmonizing lamp temperature, the wavelength spectrum of the lamp, the nature of the substrate, the use of filters, and the IR or NIR absorption characteristics of the substrate, the latter is heated to the desired temperature. The appropriate parameters for this purpose can be determined individually by simple practical tests.

Likewise possible is preheating through a combination of radiant energy, IR and/or NIR, with convection, which is in fact preferable in the case of a complex three-dimensional component geometry with shadow areas.

The temperature of the preheating is situated preferably in a range from 40° C. to 140° C., according to how much time there is between the preheating operation and the powder coating operation (cooling rate). Depending on the substrate material used, the electrical surface resistance goes down as the temperature rises, and the substrate becomes dissipative and therefore electrostatically powder-coatable. The necessary preheating temperature can be easily determined by practical tests. Consideration should be given to the retention of shape by the workpiece under thermal loading.

Prior to the coating, the surface to be coated may be cleaned. Such cleaning removes coarse particles of dust and grease from the surface. Cleaning may be accomplished mechanically by brushing or by means of a wiping technique with a lint-free cloth. The brush or the cloth may be moistened, with an alcohol/water mixture, for example, preferably with an isopropanol/water mixture with a ratio of 50/50. Accordingly it is possible to remove grease traces and salts to a very large extent.

Prior to coating, a pretreatment may take place on the surface to be coated, more particularly in order to increase the surface tension to a level of >40 mN/m, preferably of >60 mN/m, more preferably of >70 mN/m. The surface tension can be determined using test inks in accordance with DIN 53364, or else by contact-angle measurement as per DIN 55660-2. The pretreatment is preferably carried out before preheating; depending on the nature of the pretreatment, however, it may also be carried out after preheating. The effect of an increased surface tension is an improved wettability of the substrate with the powder coating heated in the course of curing.

The pretreatment may be a process selected from the following group:
  machining, more particularly by abrading and/or blasting,
  flaming,
  plasma treatment.

In the plastics sector, flaming is the most simple technique for activating a surface, for modifying the microtopography, and at the same time removing impurities, especially organic impurities. The flame is put into the oxidizing range through an excess of oxygen. In this way, polar groups are formed on the surface, and activate it. The substrate is briefly heated at its surface to 150° C. to 400° C., during which impurities are burnt and at the same time the surface is incipiently melted and partially oxidized. As a result, the surface is reformed with an amended topography and chemical composition. Any gas inclusions in the substrate can be driven off partly by this measure, resulting subsequently in an improved surface quality. The substrates can be flamed using a gas burner and, for example, a propane gas, butane gas or propane/butane gas mixture. The distance of the flame here is typically about 3 cm to 15 cm, and the speed with which the flame is passed over the surface is from 1 cm/s to 20 cm/s. As a result of the flaming, the surface becomes activated and is able to achieve improved intermediate adhesion with the subsequently applied powder coating layer. In general, the surface is activated by the gas flame being passed over the surface a number of times, preferably between 1 and 15 times. Depending on application, as well as the combustion gases, an organic silane compound may also be introduced into the gas stream for the purpose of optimizing adhesion. In this way, for example, a Pyrosil® layer can be deposited, which brings about an increase in the surface tension, the hydrophilization of the surface, and the development of a defined chemical surface structure.

Plasma treatment of the substrate may be carried out, for example, using the OpenAir plasma process under atmospheric pressure. In this case a gas is supplied with energy to bring it into the plasma state. This energy may be supplied in the form of heating, application of an electrical voltage, or the feeding-in of electromagnetic waves. The plasma let is a mixture of mostly positively charged ions, electrons, or neutrons. The resulting plasma jet flows on to the substrate and generates polar groups on the substrate surface, thereby increasing the surface tension and, consequently, the adhesion of the subsequent coating layer. In contrast to flaming, there is little or no increase in the surface area of the substrate in this case. The surface temperature of the substrate as well rises only slightly in comparison to the flaming operation, and is typically less than 60° C. Moreover, the plasma jet cleans the surface and removes possible residues of dirt, dust, or grease, especially organic impurities. A plasma treatment as well can be used to drive off partly any gas inclusions in the substrate, subsequently permitting an improved surface quality. Similarly to the case with flaming, the surface is activated by the plasma treatment, achieving improved intermediate adhesion with the subsequently applied powder coating.

The increase in the surface tension of the substrate can be brought about before and/or after the preheating. Increasing the surface tension beforehand simplifies the production sequence of the method, since, for example, the surface tension can be carried out in a separate workstep in an independent workstation. It has emerged that, depending on the way in which the surface tension is generated, it is highly stable over relatively long timespans and can even be generated a number of days in advance. In particular, a surface tension generated by plasma treatment is highly stable over several days. For example, surface tension may be generated by the actual manufacturer of the substrate, or immediately on delivery and/or at the goods-in checking stage.

The step of coating with powder coating may take place by means of a process or a combination of processes selected from the following group:
  spraying, more particularly with a corona or tribo process,
  fluidized-bed sintering for powder application, with or without parallel curing of the powder coating,
  electrostatic fluidizing-bed technology and/or with transfer application,
  combinations of the stated processes.

Coating by spraying with powder coating has the advantage that conventional lines need only slight adaptation and that there is already copious experience in this process step. The volume of investment required for adaptation to the new method of the invention is limited. Through the use of the corona process, the cloud of powder ejected from the spray gun becomes homogeneous and "soft", thus permitting uniform coating. The application of the tribo process results in better coverage of marginal and edge regions of the substrate, leading in turn to uniform coating up to the edge region of the substrate. Both processes are well known, to the skilled person.

Coating by means of fluidized-bed sintering allows a technically simple coating procedure, assuming sufficiently precise monitoring of the residence time of the substrate in the fluidized bed, and of the temperature of the substrate. By fluidized-bed sintering moreover, a thicker coating layer can be applied than in the case of spraying.

If the particles of the coating powder in the fluidizing tank are additionally electrostatically charged and at the same time the substrate to be coated is provided with a charge of opposite sign, being provided more particularly with an opposing terminal on its side facing away from the surface to be coated, a thicker coating layer is able to form, with the same or shorter residence time, as in the case of fluidized-bed sintering.

One special form of the electrostatic fluidizing-bed technology is that of transfer application, in which the powder is first applied to a transfer belt, from which it is transferred by means of a high-voltage electrode to the substrate conveyed past it. Transfer application of this kind is known from EP 1 321 197 A2, for example.

Depending on the substrate geometry, a combination of processes, such as of the electrostatic fluidizing-bed technology and spray application, for example, is also an economical and efficient coating process. In that case, in the event of a combination of the stated processes, the spray application may in each case take place in parallel with and/or downstream of the other respective process. With the aid of the electrostatic fluidizing bed, the underside of the profiles can be coated easily and particularly quickly. The top face is coated in parallel or subsequently using one of the known spray applications with corona or tribo charging. The top and bottom faces of the substrate can be coated simultaneously in this way, in one workstep and/or in one workstation, forming the basis for a massive time saving. In the subsequent curing step, therefore, the coating can also be cured simultaneously on its top and bottom faces.

The step of curing the powder coating layer may take place by means of a process selected from the following group:
  baking in a convection oven at temperatures in a range from 80° C. to 170° C., preferably from 100° C. to 160° C., more preferably from 120° C. to 140° C. over a timespan of 1 min to 60 min, more particularly of 3 min to 40 min, preferably of 5 min to 20 min,
  infrared irradiation (IR),
  irradiation by near infrared radiation (NIR),
  irradiation and curing by ultraviolet radiation (UV), more particularly in combination with connective heat and/or IR radiation and/or SIR radiation for melting and/or curing the coating layer,
  combinations of the stated processes.

In the course of curing, there is usually initial melting and simultaneously crosslinking of the powder coating layer. In the course of crosslinking, a multiplicity of individual macromolecules of the powder coating are linked to form a three-dimensional network. The crosslinking operation results in a change to the properties of the crosslinked coating layer. There is an increase observed in the hardness, the toughness, the melting point and/or the melting range, and a reduction in the solubility. Overall, the chemical and physical robustness of the coating layer is improved. The changes identified increase as the degree of crosslinking increases. Depending on the degree of crosslinking, the crosslinking of the powder coating layer results first in a layer having properties similar to an elastomer, and, in the event of increasing crosslinking, in a thermoset coating layer.

The energy required for curing, especially for initial melting and for crosslinking, may be introduced thermally by convection and/or radiant energy. The energy may be introduced in the form of infrared, radiation with a wavelength of 3 μm to 50 μm, of near infrared radiation with a wavelength of 0.7 μm to 3 μm, or of ultraviolet radiation with a wavelength of 1 nm to 380 nm.

Combinations of the various forms of radiation, with one another or in combination with convection processes, are also conceivable. The process which is best for curing of the powder coating layer depends on the power coating system used and on the substrate. Since not every color absorbs every wavelength of the aforementioned forms of radiation equally, the shade of the color to be cured must also be taken into account, and either the wavelength of the radiation, the power density of the radiation and/or the duration of irradiation must be adapted. This, however, corresponds to a routine measure for a skilled person.

There is no need for chemical adhesion promoters to be used. Foregoing chemical adhesion promoters in this way makes a key contribution to protecting the environment. It has emerged, moreover, that when an adhesion promoter is used, with certain coated substrates, the powder coating layer is severely damaged after curing, as a result of blistering. The adhesion promoter can diffuse into the substrate and outgas on curing, meaning that coherent or smooth surfaces are impossible to achieve. Furthermore, the use of adhesion promoters may also result in unwanted color changes of the powder coating.

100% solvent-free powder coatings can be used. Solvent-free powder coatings are generally preferred over those with solvents in relation to environmental consideration. The degree of utilization of material is significantly higher as well, owing to increased recoverability of the solvent-free powder coating, and can be up to 97%, depending on application.

The powder coatings may be selected from the group encompassing:
polyester powder coatings,
epoxy powder coatings,
polyester-epoxy powder coatings,
polyurethane powder coatings,
acrylate powder coatings,
fluoropolymer powder coatings,
polyamide powder coatings.

Polyester powder coatings meet the most exacting requirements in terms of weathering stability. They are resistant toward UV radiation and offer many years of protection, not least in the exterior sector, for architectural facing applications, for example. With polyester powder coatings, moreover, excellent coating quality is achievable. The polyester powder coatings may have a variety of crosslinking mechanisms. Systems based on polyaddition do not give off elimination products during crosslinking. Correspondingly, no pinholes or rough surfaces are formed. There are many years of experience available in systems based on polycondensation. These systems are notable for low baking temperatures and smooth leveling. On crosslinking, however, they usually form water, which may frequently lead to pinholes and blistering at relatively high layer thicknesses. Systems based on radical polymerization show the advantages of a polyaddition system and have low outgassing accordingly. Furthermore, above the deblocking temperature of the initiator molecule, these systems are extremely reactive and crosslink very quickly. Until the deblocking temperature of the initiator molecule is reached, the coating film is able to flow and ensures smooth leveling on the surface. The deblocking temperature refers to the initiation temperature at which the initiator molecule or initiator undergoes dissociation and is able to initiate the reaction.

Pure epoxy powder coatings are suitable for protection from corrosion and are notable for outstanding chemical resistance and good strength of adhesion. On account of the absence of light stability, however, they are suitable only for inferior applications or as primers. For this reason, it is common to use polyester-epoxy powder coatings, known as hybrid powder coatings, in which epoxy resins and polyester resins are crosslinked with one another. The properties of the two pure systems are combined, producing a broadened spectrum of application. The weathering stability is better than for pure epoxy systems, and in many cases the resistance toward chemicals is good to sufficient. Different gloss and texture settings are easy to realize. The shade diversity can be set almost without limitation.

Polyurethane powder coatings exhibit very good leveling and excellent weathering and chemical resistance. On account of their resistance, for example, polyurethane powder coatings are used in the area of antigraffiti coatings.

Acrylate powder coatings have good to excellent leveling and very good weathering stability. The properties of acrylate powder coatings satisfy, in particular, the exacting requirements of the automobile industry. By virtue of low crosslinking temperatures, it is possible to lower the energy costs associated with curing.

Fluoropolymer powder coatings have particularly high UV resistance. They are used whenever these outstanding UV resistance qualities are called for.

High layer thicknesses can be achieved with polyamide powder coatings. Moreover, polyamide powder coatings have high flexibility, meaning that they are employed preferentially on moving components or those exposed to flexing and/or torsion.

The reactivities of powder coatings can be custom-tailored. A distinction is made here between low-temperature systems, also called LT systems, having a crosslinking temperature of 130° C. or more, and ultra low-temperature powder coatings, also called ULT systems, with baking conditions of less than 130° C. There is, however, no sharp cutoff in the definition of this division into LT and ULT systems, and it can be employed only as a guide designation.

LT systems, i.e., low-temperature powder coatings, can be cured even at temperatures of 130° C. and above, typically 140° C. and above. Through the use of such LT systems, accordingly, it is possible to achieve a substantial reduction in the energy requirement associated with curing. Moreover, the thermal load on the substrate is reduced.

A development onward from the LT systems are the ULT systems, being ultra low-temperature powder coatings. These can be cured even at temperatures below 130° C., as for example at 120° C. or even at 105° C. The trend is even still ongoing in the direction of temperatures well below 100° C., ULT systems of these kinds can even be used to powder-coat substrates which must not be exposed to elevated temperature. The energy requirement for curing is reduced once more.

The powder coating may comprise electrostatic additives which influence the electrostatic properties. On account of their conductivity, these additives ensure increased conductivity on the part of the powder coating. In this way, substrates with poor conduction can be coated using electrostatic coating processes. Electrostatic additives modify the electrical conductivity of the powder coating and may lead accordingly to improved powder application. Electrostatic additives are known from the metal coatings sector, where they may have the function in particular of reducing Faraday cage effects.

The substrate may comprise a material selected from the group encompassing:
glass fiber-reinforced plastic (GRP),
polyamides (PA),
polyurethanes (PU),
polyesters,
medium-density wood fiberboard (MDF),
high-density fiber/board (HDF),
natural woods,
chipboard,
wood-plastic composite (WPC),
carbon fiber-reinforced plastic (CRP), Where the substrate used comprises natural woods, chipboard, MDF, HDF, or wood-plastic composites, conditioning may take place, by storage of the substrate at defined relative humidity and/or temperature. Furthermore, when using natural woods, chipboard, MDF, HDF, or wood-plastic composites as the substrate, this substrate may first of all be abraded, in order to ensure a smoothed and uniform surface for the electrostatic coating process. By preheating, particularly to a temperature in the range from 40 to 140° C., of a wood-based substrate as mentioned above, salts and/or volatile wood constituents are transported to the surface of the substrate, by expulsion of moisture, where they remain over a longer term ("activation effect"). In this way, the surface conductivity of the wood-based substrate is increased and hence electrostatic coating becomes possible. The "activation effect" is independent of the nature of the wood used, although it does vary in its extent according to the wood species. The curing of the powder-coating on a wood-based substrate may likewise take place in the temperature range from 80 to 170° C., preferably 100 to 160° C., more preferably 120 to 140° C. If the relative humidity of the substrate is too high, paint defects occur in the form of blisters and bulges. If the relative humidity of the substrate is too low, the surface resistance is not shifted into the dissipative range. Accordingly, conditioning is substrate-specific and must be determined experimentally.

Where the substrate used comprises natural woods, chipboard, MDF, HDF, or wood-plastic composites, pretreatment by flaming has emerged as being particularly advantageous. By this means, upright wood fibers which may disrupt the surface quality are removed by flaming. At the same time, the substrate in this case is heated ("activation effect").

The substrate may comprise a material having a fraction of glass fibers or of carbon fibers of between 20% to 80%, more particularly between 30% to 70%, preferably between 40% to 60%. Substrates of this kind allow a considerably higher mechanical loading. Such substrates are in diverse use as engineering plastics, for example.

Before the substrate is coated, it can be at least partly degassed by thermal exposure. Such degassing prevents or reduces the blistering when the powder coating cures, and therefore promotes a smooth surface to the coating.

The invention further relates to a method for coating a surface of an electrically nonconducting substrate with powder coatings, more particularly in accordance with the preceding versions, comprising one or more electrostatic additives. This achieves improved coating of surfaces of nonconducting substrates.

The invention further relates to the use of a powder coating comprising one or more electrostatic additives for coating a surface of an electrically nonconducting substrate.

A substrate, more particularly a nonconducting substrate, having a coated surface produced by a method as described above has the stated advantages.

The invention is described in more detail below using figures.

FIG. 1 diagram with the temperature and the surface resistance of a substrate relative to time.

Figure 2:
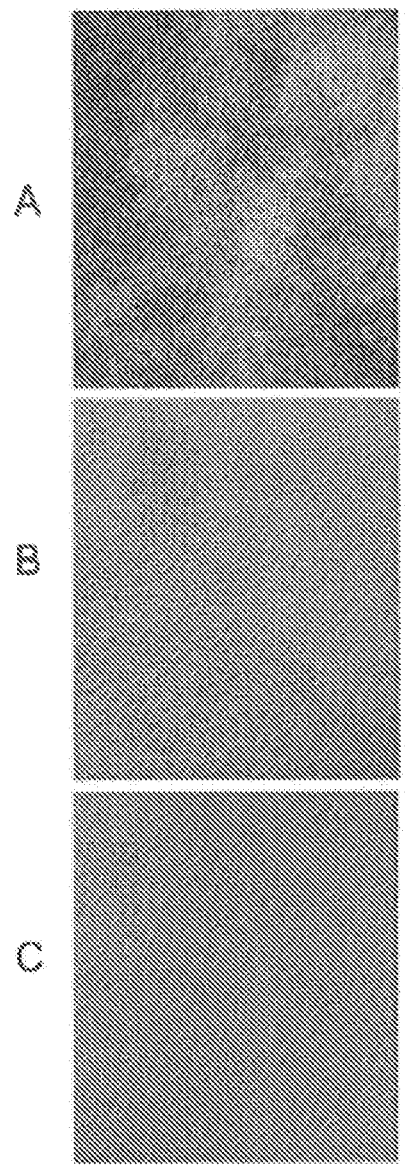

FIG. 2 substrate coatings in the case of characteristic surface resistances.

Figure 3:
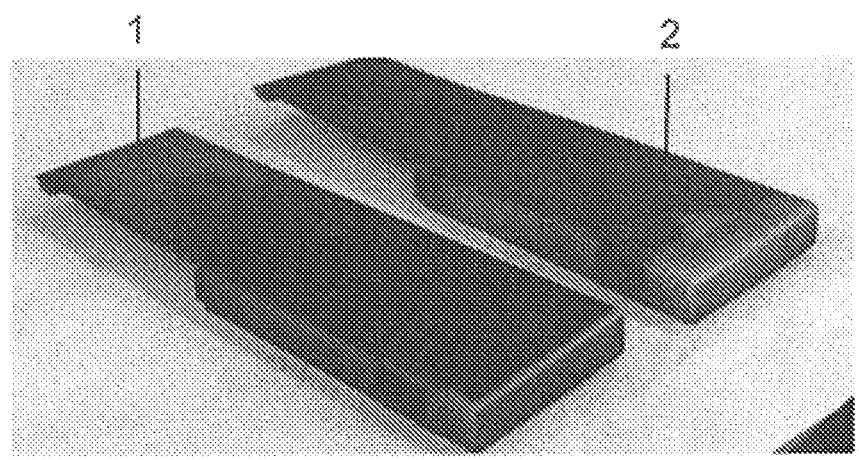

FIG. 3 comparison of substrate coatings with powder coating comprising electrostatic additives.

FIG. 1 shows a diagram which depicts the temperature profile and the surface resistance of a substrate as a function of time. The substrate was installed in a heating oven for 10 sec for heating and then removed from the oven. The temperature of the heating oven was constant at 130° C. Depending on the thickness of the substrate, it is heated to a temperature between the ambient temperature (outside the heating oven) and the temperature of the heating oven (cf. FIG. 1, at about 44° C.). The temperature and the surface resistance of the substrate were measured at room temperature during the cooling process. The measurement values plotted are those directly after removal from the heating oven for 2 min 30 sec.

As a result of the preheating of the substrate, the surface resistance was lowered to a level of about $5\times10^{10}$ ohms at a temperature of about 44° C. On storage at room temperature, the substrate cools down to 36° C. within a minute. With this falling temperature, the surface resistance increases from about $5\times10^{10}$ ohms to about $7\times10^{11}$ ohms within a minute. Within this range, complete and high-quality single-layer electrostatic coatings can be obtained, since under these conditions the substrate has a sufficiently conducting surface.

FIG. 2 shows substrate coatings in the case of characteristic surface resistances. The substrates were preheated and then coated by electrostatic powder application. The powder coating applied was subsequently cured.

FIG. 2A shows a coated substrate, the substrate having not been preheated, and having a surface resistance of $>10^{12}$ ohms. Following electrostatic powder application, the substrate is inadequately coated. The white areas feature powder of the coating, while in the black areas the substrate is visible without coating. A powder coating of the substrate with a surface resistance of $>10^{12}$ ohms is incomplete and therefore inadequate.

FIG. 2B shows a coated substrate, the substrate having undergone minimal preheating and thus having a surface resistance of $5\times10^{11}$ ohms. Following electrostatic powder application, the substrate is almost completely coated in comparison to FIG. 2A, but nevertheless has black (uncoated) areas.

FIG. 2C shows an inventively coated substrate which after preheating had a surface resistance of $10^{11}$ ohms. Under these conditions, electrostatic powder application results in a homogeneous, smooth and continuous coating on the substrate. The coating corresponds to a coating of the kind known for metals and conductive substrates.

FIG. 3 shows coated components where the coatings took place under identical conditions. Component 1 has a coating of powder coating, the powder coating comprising electrostatic additives. In comparison, the coating of component 2 does not comprise any electrostatic additives. Especially at the narrow facing sides, the advantageous properties mediated by electrostatic additives are illustrated. In contrast, to component 2, component 1 has an advantageous coating. Coating modifications with electrostatic additives additionally improve the coating outcome.

Further aspects of the invention relate to:
A. A method for coating a surface of an electrically nonconducting substrate with powder coatings, comprising the steps of:
   providing a substrate to be coated,
   preheating the substrate to be coated,
   coating the surface with powder coating,
   curing the powder coating layer.
B. The method according to A, characterized in that the preheating takes place at a temperature between 100° C. and 220° C., more particularly between 110° C. and 190° C., preferably between 120° C. and 170° C. and over a timespan of 5 min to 2 h, more particularly of 20 min to 90 min, preferably of 40 min to 75 mm.
C. The method according to A or B, characterized in that prior to coating, the surface to be coated is pretreated, more particularly via an increase in the surface tension to a level of >40 mN/m, preferably of >60 mN/m, more preferably of >70 mN/m.
D. The method according to C, characterized in that the pretreatment is a process selected from the group;
   mechanically roughening, more particularly by abrading and/or blasting,
   flaming,
   plasma treatment.

E. The method according to C or E, characterized in that the pretreatment of the surface takes place before and/or after the preheating.

F. The method according to any of aspects A to E, characterized in that the step of coating with powder coating takes place by means of a process selected from the following group:
- spraying, more particularly with a corona or tribe process,
- fluidized-bed sintering,
- electrostatic fluidizing-bed technology, in particular with transfer application,
- combination of the stated processes.

G. The method according to any of aspects A to E, characterized in that the step of curing the powder coating layer takes place by means of a process selected from, the group:
- baking in a convection oven at temperatures in a range from 100° C. to 230° C., preferably from 110° C. to 190° C., more preferably from 130° C. to 160° C. over a timespan of 1 mm to 60 min, more particularly of 3 min to 40 min, preferably of 5 min to 20 min,
- infrared irradiation (IR),
- irradiation by near infrared radiation (NIR),
- irradiation and curing by ultraviolet radiation (UV), more particularly in combination with convective heat and/or IR radiation and/or NIR radiation for melting and/or curing the coating layer,
- combinations of the stated processes.

H. The method according to any of aspects A to G, characterized in that no chemical adhesion promoters are used.

I. The method according to any of aspects A to H, characterized in that solvent-free powder coatings are used.

J. The method according to any of aspects A to I, characterized in that reactive systems are used as powder coatings.

K. The method according to any of aspects A to J, characterized in that the powder coatings are selected from the group comprising:
- polyester powder coatings,
- epoxy powder coatings,
- polyester-epoxy powder coatings,
- polyurethane powder coatings,
- acrylate powder coatings,
- fluoropolymer powder coatings,
- polyamide powder coatings.

L. The method according to any of aspects A to K, characterized in that the powder coatings are low-temperature powder coatings or ultra low-temperature powder coatings.

M. The method according to any of aspects A to L, characterized in that the substrate comprises a material selected from the group comprising:
- glass fiber-reinforced plastic (GRP),
- polyamides (PA),
- polyurethanes (PU),
- polyesters,
- medium-density wood fiberboard (MDF),
- high-density fiberboard (HDF),
- natural wood,
- glass,
- ceramic.

N. The method according to any of aspects A to M, characterized in that the substrate comprises a material having a fraction of glass fibers of between 20% to 80%, more particularly between 30% to 70%, preferably between 40% to 60%.

O. The method according to any of aspects A to N, characterized in that before the substrate is coated, the substrate is at least partly degassed, more particularly substantially completely degassed, by thermal exposure.

P. A substrate, more particularly a nonconducting substrate, having a coated surface produced by a method according to any of aspects A to O.

The invention claimed is:

1. A method of coating a surface of an electrically nonconducting substrate with powder coatings, comprising the steps of:
   - providing a substrate to be coated,
   - preheating the substrate to be coated to a temperature of 40 to 140° C. to lower the surface resistance of the substrate to less than $10^{12}$ ohms,
   - single-layer, electrostatic coating of the surface with a powder coating which comprises a reactive system, and
   - curing the powder coating at a temperature of not more than 170° C.,
   - wherein the surface to be coated is pretreated, prior to coating, via an increase in the surface tension to a level of >40 mN/m.

2. The method according to claim 1, wherein said preheating lowers the surface resistance of the substrate in the range from $10^{10}$ to less than $10^{12}$ ohms.

3. The method according to claim 1, wherein said reactive system is one curing to a thermoset.

4. The method according to claim 1, wherein the preheating takes place over a timespan of 5 sec to 90 min.

5. The method according to claim 1, wherein the substrate is preheated in an oven.

6. The method according to claim 1, wherein the pretreatment is a process selected from the group consisting of:
   - machining,
   - flaming, and
   - plasma treatment.

7. The method according to claim 1, wherein the pretreatment of the surface takes place before and/or after the reheating.

8. The method according to claim 1, wherein the step of coating with powder coating takes place by a process selected from the group consisting of:
   - spraying,
   - fluidized-bed sintering,
   - electrostatic fluidizing-bed technology and/or with transfer application, and combinations thereof.

9. The method according to claim 1, wherein A the step of curing the powder coating takes place by a process selected from the group consisting of:
   - baking in a convection oven at temperatures in a range from 80° C. to 170° C. over a timespan of 1 min to 60 min,
   - infrared irradiation (IR),
   - irradiation by near infrared radiation (NIR),
   - irradiation and curing by ultraviolet radiation (UV), and a combinations thereof.

10. The method according to claim 1, wherein no chemical adhesion promoters are used.

11. The method according to claim 1, wherein solvent-free powder coatings are used.

12. The method according to claim 1, wherein the powder coatings are selected from the group comprising:
   - polyester powder coatings,
   - epoxy powder coatings,
   - polyester-epoxy powder coatings,
   - polyurethane powder coatings,
   - acrylate powder coatings, fluoropolymer powder coatings, and
polyamide powder coatings.

13. The method according to claim 1, wherein the powder coatings are low-temperature powder coatings or ultra low-temperature powder coatings.

14. The method according to claim 1, wherein the powder coating comprises electrostatic additives.

15. The method according to claim 1, wherein the substrate comprises a material selected from the group comprising:
glass fiber-reinforced plastic (GRP),
polyamides (PA),
polyurethanes (PU),
polyesters,
medium-density wood fiberboard (MDF),
high-density fiberboard (HDF),
natural wood,
chipboard,
wood-plastic composite (WPC),
carbon fiber-reinforced plastic (CRP),
glass, and
ceramic.

16. The method according to claim 1, wherein the substrate comprises a material having a fraction of glass fibers or of carbon fibers of between 20% to 80%.

17. The method according to claim 1, wherein adhesion of the powder coating, during coating, is mediated only by electrostatic effects without melting of the powder coating on the substrate.

18. A method of coating a surface of an electrically nonconducting substrate with powder coatings, according to claim 1, further comprising one or more electrostatic additives.

* * * * *